(12) United States Patent
Jung et al.

(10) Patent No.: US 8,965,830 B2
(45) Date of Patent: Feb. 24, 2015

(54) SYSTEMS AND METHODS FOR SELF-ADAPTIVE EPISODE MINING UNDER THE THRESHOLD USING DELAY ESTIMATION AND TEMPORAL DIVISION

(75) Inventors: Gueyoung Jung, Rochester, NY (US); Shanmuga-Nathan Gnanasambandam, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 247 days.

(21) Appl. No.: 13/474,083

(22) Filed: May 17, 2012

(65) Prior Publication Data

US 2013/0311994 A1 Nov. 21, 2013

(51) Int. Cl.
*G06F 17/00* (2006.01)
*G06N 5/02* (2006.01)

(52) U.S. Cl.
USPC .......................................................... 706/48

(58) Field of Classification Search
None
See application file for complete search history.

(56) References Cited

U.S. PATENT DOCUMENTS 7,051,029 B1 * 5/2006 Fayyad et al. ..................... 1/1
7,644,078 B2 * 1/2010 Sastry et al. .................... 706/20

OTHER PUBLICATIONS

Temporal data mining: algorithms, theory and applications (TDM 2005) Proceedings of a Workshop held in Conjunction with 2005 IEEE International Conference on Data Mining Houston, USA, Nov. 27, 2005.*

* cited by examiner

*Primary Examiner* — Wilbert L Starks
*Assistant Examiner* — Ababacar Seck
(74) *Attorney, Agent, or Firm* — MH2 Technology Law Group LLP

(57) ABSTRACT

Embodiments relate to systems and methods for self-adaptive episode mining under time threshold using delay estimation and temporal division. An episode mining engine can analyze a set of episodes captured from a set of network resources to detect all sequences of user-specified frequency within a supplied runtime budget or time threshold. The engine can achieve desired levels of completeness in the results by mining the input log file in multiple stages or steps, each having successively longer lengths of event sequences. After completion of each stage, the engine calculates a remaining amount of runtime budget, and updates the amount of time to be allocated for each of the remaining stages up to a generated maximum stage (or sequence length). The engine thus corrects the estimated remaining time in the runtime budget (or threshold) after each stage, and continues to the next stage until the runtime budget is consumed.

14 Claims, 7 Drawing Sheets

SYSTEMS AND METHODS FOR SELF-ADAPTIVE EPISODE MINING UNDER THE THRESHOLD USING DELAY ESTIMATION AND TEMPORAL DIVISION

FIELD

The present teachings relate to systems and methods for self-adaptive episode mining under time threshold using delay estimation and temporal division, and more particularly, to platforms and techniques for a user-configurable data mining platform, in which a user can specify a runtime budget, time limit, and/or other time constraint to locate events of interest in a network log file, and completing a discovery process within that time budget while still locating a significant portion of all events of interest.

BACKGROUND

In known network management systems referred to as episode mining systems, platforms have been arranged which track or log the activities of users across various sites and resources of the network. Known platforms can for example be configured to log user activity such as visiting various Web sites, sending or receiving email, initiating instant message (IM) or other chat or messaging sessions, accessing a telephone support line, or others. Network event logs are becoming an important data source in business applications. A typical example of event logs is a web server access log, which maintains a history of page requests from users. Enterprises need to analyze such Web server logs to discover valuable information including Website traffic patterns and user activity patterns by time of day, time of week, or time of year.

For instance, Human Resource portals (e.g. in benefits enrollment and maintenance) or Financial Service portals (e.g. student loans) often need to monitor and analyze various user events such as life events (e.g., marriage, having a baby, etc.) and financial choices: (e.g. 401K, insurance, etc.) obtained from multiple, applications or services including telephone calls, web log, and chats. Using the results (i.e., sequential patterns of user events), a systems administrator can precisely target the future events (e.g., future phone calls) of each user. A core part of episode mining systems is discovering episodes from large event logs, where an episode is defined as a collection of events occurring frequently together within a time interval ("episode" and "frequent pattern" can be used interchangeably herein this ID). An event log is divided into a set of event sequences by a certain time interval (e.g., web session in web log).

Although a number of episode mining (also referred to as frequent sequential pattern mining) platforms and techniques have been developed, the mining performance is limited in that they require from a few hours to a few days to execute, especially when very large event logs are processed as input. Therefore, classical episode mining techniques have typically been implemented as batch processes only. Two of the known episode mining approaches are referred to as the classical apriori algorithm, and its more general version, sometimes referred to as the GSP algorithm. Generalized algorithms such as GSP have also been introduced to integrate some domain-specific time constraints to sequential patterns. The basic algorithm of the known apriori algorithm operates as follows:

While k-length candidate patterns exist:
 1) For each k-length candidate pattern
  i. For each event sequence in event log
  ii. If the candidate pattern exists in the event sequence
   1. Increase the count of the occurrence of the candidate pattern;
 2) Record a set of frequent k-length patterns, based on their counts;
 3) Building a set of new (k+1)-length candidate patterns from the prior frequent patterns;
 4) Increase the pattern length (i.e., k=k+1).

The length of a pattern indicates the number of events in the pattern or sequence. For example, 3-length pattern looks like "ABC", where each character represents an event. As shown in the steps above, the apriori approach iteratively scans all event sequences to figure out frequent patterns. Specifically, at each step in the iteration (i.e., the outer while loop), it builds new candidates from previous frequent patterns (step 3), increases the pattern length by one (step 4), and discovers new frequent patterns by scanning all given event sequences (step 1). This iteration is terminated when the process cannot build further candidates.

The bottleneck of the apriori algorithm is mainly caused by blindly scanning all given event sequences per step with a number of candidates. The apriori technique must do this type of scanning multiple times, to generate all different lengths of frequent patterns. Although this algorithm is direct and can be extended to integrate various domain specifics, it has been known that applications can be limited due to the performance issue when analyzing large event logs.

The known pattern-growth algorithms have been introduced to attempt to speed up the episode mining. This class of algorithm does not build candidate episodes. Instead, it recursively constructs new projected sub-sets of event sequences and then, restricts the pattern search in each projected set. For example, an X-projected set is a sub-set of event sequences, which has a set of event sequences starting with the pattern prefix "X". The size of this X-projected set indicates the frequency of the pattern "X". At each step, the algorithm extends the prefix (e.g., "XY"), and then constructs a new projected set (e.g., XY-projected set) from the X-projected set.

It is known that approaches using the pattern-growth algorithms usually outperform apriori-based approaches because they can avoid building candidates, and reduce the search space as the mining, progresses. However, constructing projected sets can likewise be computationally expensive. Additionally, under a high pattern density condition, where identical patterns are densely packed into event sequences, the reduction rate of the search space can be lower than expected over the complete mining process due to large overlaps between projected sets. This condition can often occur in many event logs such as web log because the number of event types (e.g., requested URLs) is usually small, and event types can be densely distributed over event sequences (i.e., patterns can be found very frequently in an event sequence). Moreover, since these approaches have not considered some mining conditions such as time interval constraint and time window to flexibly define patterns as GSP does, it is difficult to apply domain-specific time constraints to these approaches.

The pattern-growth algorithm can therefore be computationally expensive for large event logs. Moreover, possible speed-up can be limited, especially under the noted high pattern density conditions. The pattern-growth method also has not considered domain, specific time constraints, such as time interval, time gap, and moving windows. As an alternative, statistical approaches can also be used, but only for relatively small datasets, assuming some specific distributions for the event sequence history.

Due to these constraints and other factors, all of the above known methods have been limited to being implemented as batch processes only, given limited computing resources available to developers, administrators, and other users. Potentially, they do not discover or generate all highly frequent patterns, particularly if they are forced to perform under a short time runtime threshold.

Moreover, the classical episode methods outlined above are limited in their application with some domain-specific constraints, again mainly due to the performance issue. Those constraints include the requirement for "agile mining", or the ability to see highly frequent patterns within a short time, as well as detection accuracy, or the completeness of generated episodes, and the tradeoff between them. The accuracy of detection means that the episode mining technique does not miss any highly frequent patterns, and the completeness criteria means that the episode mining process will generate all possible frequent episodes. To attempt to achieve the reasonable accuracy and completeness, an episode mining algorithm must explore all possible candidate episodes in apriori-based approaches, or all possible projected sub-sets of event sequences in pattern-growth-based approaches. Meanwhile, to achieve the requirement of agile mining, especially within a time threshold that may be given by user, known episode mining algorithms potentially sacrifice accuracy and the completeness, by interrupting the process before it is completed. Known classical methods therefore do not guarantee the accuracy when producing time-constrained intermediate results.

This is the case even though administrators or other users often want to quickly capture highly frequent patterns to see the high-level pattern trends, or to seek an agile targeting for certain problems in many practical situations, instead of waiting hours or days until a batch process generates a set of complete episodes. They may want to flexibly provide the upper-bound time threshold to the system to obtain the highly frequent and meaningful patterns first, and discover the rest of patterns when time permits, possibly by later batch processing.

It may therefore be desirable to provide methods and systems for self-adaptive episode mining under time threshold using delay estimation and temporal division, in which data mining operations, can be conducted under a given time threshold or limit, and which may be achieved by quantifying and incorporating analysis of the tradeoff between the completeness and the runtime budget or other time threshold, limit, and/or constraint of the desired episode mining.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for self-adaptive episode mining under time threshold using delay estimation and temporal division. More particularly, embodiments relate to platforms and techniques for detecting event episodes matching a desired set of event patterns or sequences to within a minimum selected degree of completeness using only a specified runtime budget, time limit, and/or other time constraint. In aspects, an episode mining engine and/or other logic, applications, and/or services can access an input log file containing the raw event data captured from the operational history of a network of interest. The engine can receive or access a set of episode mining parameters including the desired event patterns or sequences, and carry out an analysis of the raw event data in successive stages in which the event length of searched-for events increases after each stage. In each stage, the set of episodes in the raw input data can be partitioned or "pruned" into one subset which will not be examined further, and a second subset whose content will be tested for a match to the episode mining parameters including the specified event sequences. Also at each stage, a remaining amount of the runtime budget, time limit, and/or other time constraint can be re-computed. The engine can thus continue to reach additional stages as long as the runtime budget or other time constraint allows. In aspects, the longest length stages is reached, and the user can be assured of locating a defined percentage (which can be most or all) events of the minimum frequency that they have specified, in return for executing the episode mining operation within the desired runtime budget, time limit, and/or other time constraint.

Reference will now be made in detail to exemplary embodiments of the present teachings, which are illustrated in the accompanying drawings. Where possible the same reference numbers will be used throughout the drawings to refer to the same or like parts.

Figure 1:
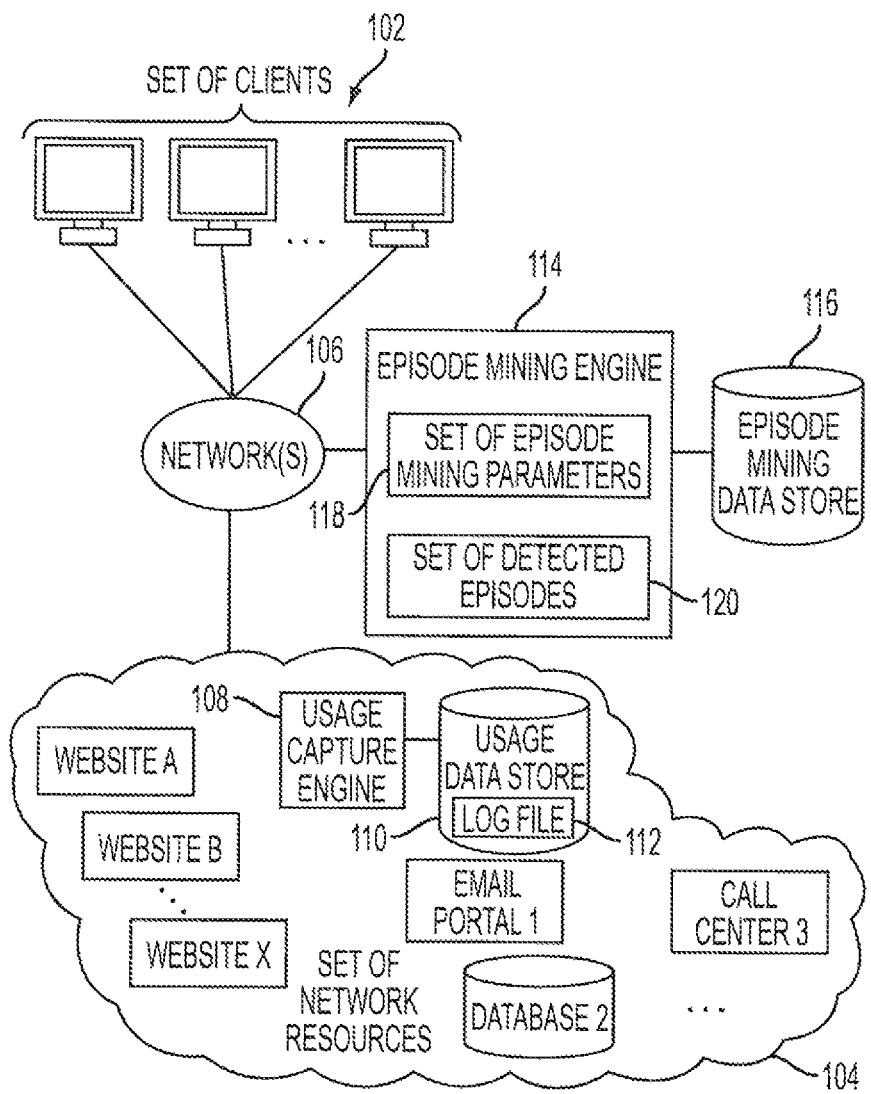
FIG. 1 illustrates an overall network which can be used in systems and methods for self-adaptive episode mining under time threshold using delay estimation and temporal division, according to various embodiments.

FIG. 1 illustrates an overall network 100 in which systems and methods for self-adaptive episode mining under time threshold using delay estimation and temporal division can operate, according to aspects. In aspects as shown, a set of clients 102 can operate to access a set of network resources 104 via one or more networks 106. In aspects, the set of clients 102 can include any one or more of desktop or laptop computers, network-enabled cellular telephones, network-enabled touch pads, and/or other network-enable or network-compatible devices. The set of network resources 104 can be, or include any one or more of Web sites, databases, email portals, messaging applications or services, telephone and/or other voice connections or services, video connections or services, and/or other media, applications, connections, sites, platforms, and/or services. In aspects, the one or more networks 106 can comprise the Internet, and/or other public or private networks. In general, the users of each machine in the set of clients 102 can access any one or more of the set of network resources 104, for example, on a subscription, account, or other access-controlled basis, and/or on a freely accessible basis as a publicly available service or resource, such as a public Web site.

In embodiments as shown, a systems administrator and/or other user or entity can operate a usage capture engine 108 to monitor and track the usage or access history of the set of network resources by 104 individual users and/or others operating the set of clients 102. The usage capture engine 108 can comprise a server, platform, application, and/or service configured to capture and store the usage history data to a log file 112. The log file 112 can be or include a data base or data store, a text file, and/or other data files, types, and/or configurations. In aspects, the log file 112 can be organized to monitor and record the pathway or history through the set of network resources 104 that is traversed by individual users. Thus for example, a line or other entry in the log file 112 can indicate that on a certain date and time, user ID "John Doe-12345" accessed Web site A followed by Web site B and Web site C, followed in turn by a toll-free telephone call to Call Center 5741 and then an email from email, address "John Doe-12345@emailservice.com" to "Tech Support Product Z@Company1.com." In aspects, each of those types of recorded actions by the user or associated with the user can be referred to as an "event" herein, while a series of more than one event can be referred to as a "sequence" or "sequence of events." Likewise, an identified or specified pattern of events which may be discovered by the inventive systems and methods described herein can be referred to as an "episode," as discussed further below. The log file 112 can contain the sequence of events tracked for multiple users accessing or using multiple resources in the set of network resources 104. In aspects, the log file 112 can comprise a relatively large data file, such as 50 GB, 100 GB, or other larger or smaller sizes.

According to aspects the usage capture engine 108 can, at periodic times, scheduled times, event-triggered times, user-specified times, and/or at other times, transmit the log file 112 (or a copy thereof) to an episode mining engine 114, which can be or include a local or remote server, platform, application, portal, and/or service configured to communicate with the usage capture engine 108 via the one or more networks 106 and/or other channels or connections. According to aspects, after receipt of the log file 112, the episode mining engine 114 and/or other server, platform, application, portal, and/or service can operate to analyze the sequence of events stored in that file to identify a set of detected episodes 120 based on a set of episode mining parameters 118, as described herein. In general, the set of episode mining parameters 118 can comprise, among other information, an enumerated list of the event patterns and/or sequences which the user wishes to locate in the log file 112.

Figure 2:
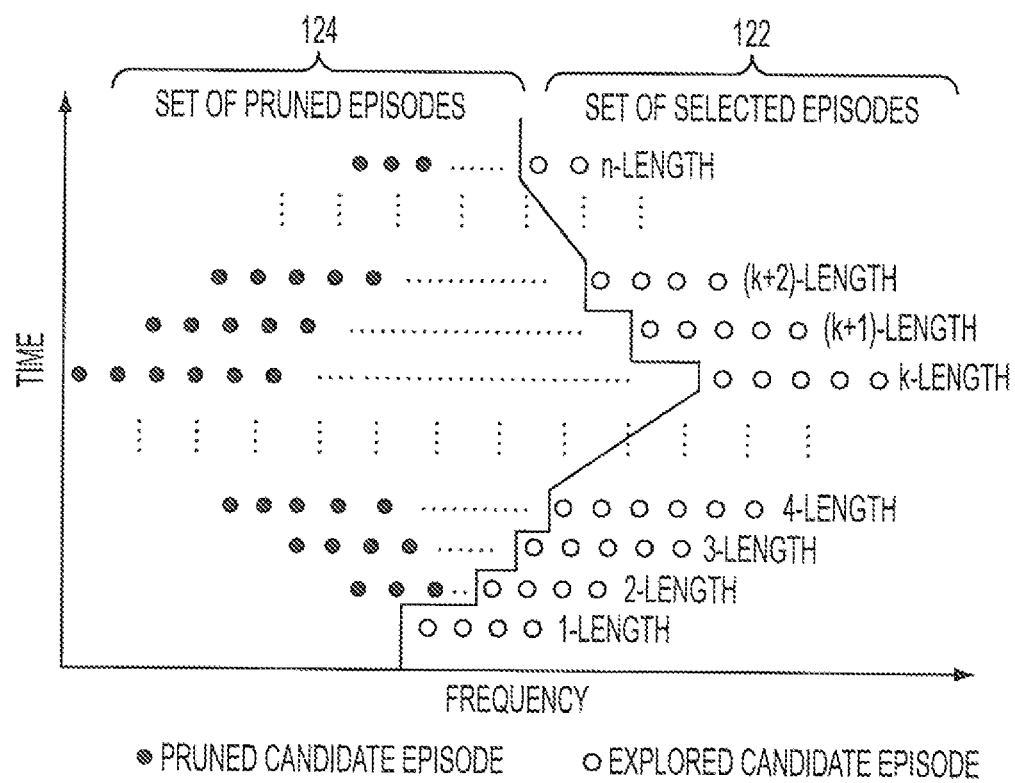
FIG. 2 illustrates various aspects of pruning operations including the separation of an input log file into a set of pruned candidate episodes and selected candidate-episodes, according to various embodiments.

More specifically, and as for instance illustrated in FIG. 2, in accordance with the present teachings, the set of episodes contained in the log file 112 can be logically processed by ordering the constituent events according to the number and/or length of the events, in successive steps or stages. In general, after processing each stage to locate matches to the set of episode mining parameters 118, the episode mining engine 114 and/or other server, platform, application, portal, and/or service can separate or "prune" the set episodes of the next stage into a subset that is chosen for immediate processing to produce a set of selected episodes 122, and leaving a set of pruned episodes 124 out of the current processing operation. In aspects, the set of pruned episodes 124 can be stored or otherwise set aside, and processed separately at a later time and/or using separate computing resources, such as by storing the set of pruned episodes 124 for subsequent batch processing by local or remote server resources.

According to aspects, the inventors herein have noted that the performance bottleneck of known episode mining is mainly caused by building and exploring of an enormous number of candidate episodes, while similar bottlenecks are produced by the number of event sequences in a number of projected sets in the known pattern-growth-based approaches. According to aspects, according to the present teachings, these and other factors can be avoided by partitioning or pruning the set of episodes in the log file into a set of selected episodes 122 whose probability for matching the set of episode mining parameters 118 is most likely, and/or which are otherwise most desirable for examination. FIG. 2 illustrates these operations in the search space, i.e., the entire collection of candidate episodes contained in log file 112, and adaptive pruning over time.

As noted above, known or classical episode mining algorithms generally iteratively explore each step, which again represents each episode length measured by the number of events in a specified pattern of events, until they cannot build candidate episodes with a certain length (e.g., "n"-length in FIG. 2). The search space can as a result exponentially increase at a certain point (e.g., "k"-length in the figure) and then linearly decrease over time using those known techniques. Hence, the delay of a mining process can also exponentially increase as it explores all possible candidate episodes up to "k"-length or other lengths. In aspects, for the known techniques, if they are given a time threshold or deadline, they potentially have insufficient time to explore beyond "k"-length. The known techniques can therefore lose the chance to detect episodes which are both highly frequent and of long length, which episodes can also be more meaningful than a number of low-frequency but with shorter length.

To avoid this situation and achieve other advantages, systems and methods for self-adaptive episode mining under time threshold using delay estimation and temporal division, can first precisely estimate the delay of the next mining step or stage in the event-length iteration, based on the size of accumulated search space and the number of event sequences related the candidate episodes. According to aspects, given computation time allocated by temporally dividing a remaining time against a time threshold or limit, embodiments can prune out a portion of candidate episodes from the current set that potentially have lower frequency. For example, and as shown in FIG. 2, after building 2-length candidate episodes, the platform and techniques of the present teachings can estimate how long it takes both to discover 2-length episodes matching the set of episode mining parameters 118, thus forming the set of selected episodes 122 for that length, and build a set of 3-length candidate episodes in the following stage.

If the estimated time for this step, computed by the temporal division algorithm noted herein, is not sufficient to deal with all possible 2-length candidate episodes, according to aspects, a portion of 2-length candidate episodes that cannot be explored within the allocated time can be pruned. By doing so, platforms and techniques according to the present teachings can explore beyond k-length, and can generate highly frequent and long length episodes within given time threshold as supplied by the user or otherwise in the set of episode mining parameters 118. As the time threshold or limit increases (i.e., allowing more time to explore search space), the number of generated episodes increases, and therefore the completeness of the set of selected episodes 122 increases. Pruned candidate episodes along the mining process can, in aspects, as noted be stored and explored at off-line times, such as by using batch processing methods.

It may be noted that the known episode mining approach builds (k+1)-length candidate episodes using k-length episodes, which are discovered with high frequency, by extending the length of each discovered episode by one. Any (k+1)-length candidate episode cannot have high frequency if it is extended from a k-length episode that has low frequency. Therefore, when attention is focused on a portion of highly frequent k-length episodes, the number of (k+1)-length candidate episodes will decrease, and then the number of (k+1)-length episodes will decrease as well. In terms of estimating delay at a given stage, in the k-length step, to proactively prune out a portion of the current (k+1)-length candidate set, the episode mining engine 114 and/or other server, platform, application, portal, and/or service can estimate the delay of discovering (k+1)-length episodes, and building (k+2)-length candidate episodes. Accurate estimation can be achieved by profiling measured performance and understanding the computational behavior of the episode mining algorithm. Based on the performance profile, the delay estimate can be mapped to the expected results. According to aspects, delay estimation can be carried out using platforms and techniques described in co-pending patent application U.S. Ser. No. 13/284,356, entitled "Methods And Systems For Scalable Extraction Of Episode Rules Using Incremental Episode Tree Construction In A Multi-application Event Space," filed Oct. 28, 2011, by Gueyoung Jung, et al., assigned or under obligation of assignment to the same entity as this application, and which co-pending patent application is incorporated herein by reference in its entirety. According to aspects, the delay is correlated to the size of accumulated episodes, since the dynamic programming algorithm used in co-pending U.S. Ser. No. 13/284,356 refers to all previously generated episodes while scanning corresponding event sequences. In known apriori-based and pattern-growth-based approaches, the delay can be correlated only to the size of the current candidate episodes, instead of the accumulated episodes. However, this assumption makes the estimation simpler than the present teachings. Thus, in embodiments, platforms and techniques according to the present teachings can be applied to those known approaches, with minor modification.

Based on these observations and other factors, to estimate the delay in the k-length step, the episode mining engine 114 and/or other server, platform, application, portal, and/or service can first monitor how many episodes are chosen from the candidate episodes up to the k-length step, and estimate the number of (k+1)-length episodes to be discovered. In aspects, the episode mining engine 114 and/or other server, platform, application, portal, and/or service can adopt the moving average technique to do this, since the change of the number is correlated to previous steps with some variances. The episode mining engine 114 and/or other server, platform, application, portal, and/or service can also compute the mean unit time taken for discovering and building art episode by measuring the delay in the previous step. With the estimates, the delay for discovering (k+1)-length episodes and building (k+2)-length candidates can be estimated. Formally, the rate of choosing episodes from, (k+1)-length candidate episodes, is defined as:

$$\rho(k+1)=|\theta(k+1)|/|c(k+1)|, \quad \text{Equation 1}$$

where $|\theta(k+1)|$ represents the number of episodes to, be discovered (k+1)-length step, and $|c(k+1)|$ represents the number of (k+1)-length candidate episodes. The rate is computed by:

$$\rho(k+1)=(1-\beta)1/(k-1)\Sigma_{i=1}^{k-1}\rho(i)+\beta\rho(k), \quad \text{Equation 2}$$

where β determines how much the episode mining engine 114 and/or other server, platform, application, portal, and/or service weights the current measurement against past measurements. β is calculated using an adaptive filter to quickly respond to large changes while remaining robust against small variations. To Calculate β, the error between the measurement and the estimate is first calculated as follows:

$$\epsilon(k)=\gamma 1/(k-2)\Sigma_{i=2}^{k-2}\epsilon(i)+(1-\gamma)\epsilon(k-1). \quad \text{Equation 3}$$

Then, $$\beta=1-\epsilon(k)/\max(\epsilon(1),\ldots,\epsilon(k-1)). \quad \text{Equation 4}$$

This technique dynamically gives more weight to the current measurement by generating a high value of β when the estimate at k-length is close to the current measurement. Otherwise, it decreases β to emphasize past measurements. In aspects, the episode mining engine 114 and/or other server, platform, application, portal, and/or service can set the parameter γ to 0.5. The mean unit time taken to discover each k-length episode for given n corresponding event sequences is:

$$d(k)=(\Sigma_{s=1}^{1}D(s,k))/|E(k)|, \quad \text{Equation 5}$$

where $|E(k)|$ is the number of accumulated episodes up to k-length step, and D(s, k) is a measured time taken for discovering k-length episodes in s event sequence. Note that if an event sequence does not contain any k-length episodes, the episode mining engine 114 and/or other server, platform, application, portal, and/or service ignores it in the mining process. Then, the estimated delay for discovering (k+1)-length episodes is:

$$D(k+1)=(|E(k)|+|c(k+1)|\rho(k+1))d(k) \quad \text{Equation 6}$$

Similarly, the episode mining engine 114 and/or other server, platform, application, portal, and/or service can estimate the delay for building (k+2)-length candidates as follows. The mean unit time taken for building a (k+1)-length candidate episode is:

$$b(k+1)=B(k+1)/|E(k)| \quad \text{Equation 7}$$

where B (k+1) is a measured time taken for building (k+1)-length candidates.

Then, the estimated delay for building (k+2)-length candidate episodes is:

$$B(k+2)=(|E(k)|+|c(k+1)|\rho(k+1))b(k+1). \quad \text{Equation 8}$$

In terms of self-adaptation based on temporal division, platforms and techniques according to the present teachings accelerates the mining process as the cumulative delay gets close to a given upper-bound time threshold by pruning a certain portion of the candidate episodes. To determine how many candidates are pruned, the episode mining engine 114 and/or other server, platform, application, portal, and/or service first allocates a computation time for the next step in the remaining mining time against the given upper-bound threshold. The episode mining engine 114 and/or other server, platform, application, portal, and/or service can apply a temporal division algorithm to allocate the computation time. At each step in the mining iteration, the episode mining engine 114 and/or other server, platform, application, portal, and/or service divides the remaining time, into multiple time segments by estimating how many steps will be executed from the current step, and allocates the first segment for the next step.

To estimate the number of remaining steps, the episode mining engine. 114 and/or other server, platform, application, portal, and/or service must first determine the potential maximum length of episodes in given event sequences. The estimated maximum length indicates the number of steps the algorithm should take in the mining iteration. While exploring each event sequence, the episode mining engine 114 and/or other server, platform, application, portal, and/or service identifies how many different event types are contained in the event sequence (i.e., the size of the union of event types in each event sequence). The episode mining engine 114 and/or other server, platform, application, portal, and/or service can consider the number of different event types as the approximate maximum length of potential episodes that can be generated from the event sequence. For example, if an event sequence is "AAABBBBAABBAABB" and each character represents an event, episodes that can be generated are "A", "B", "AB", and "BA." Note that an episode does not contain any duplicated event or sub-episodes. For example, "AA", "BB", "AABB", and "ABAB" are not considered as episodes. Thus, the maximum length of potential episodes in the example will be 2, since it contains 2 different event types (A and B). Similarly, if an event sequence is "AAAABBC-CCCAABC", the potential maximum length will be 3, since it contains 3 different event types (A, B, and C). The episode mining engine 114 and/or other server, platform, application, portal, and/or service can record the number of different event types of each event sequence when exploring all event sequences in the current step, and uses the average value as the number of remaining steps. Then, the episode mining engine 114 and/or other server, platform, application, portal, and/or service divides the remaining time into segments by the number of remaining steps, and takes the end of the first segment as the upper-bound allowed to the next step.

Figure 3:
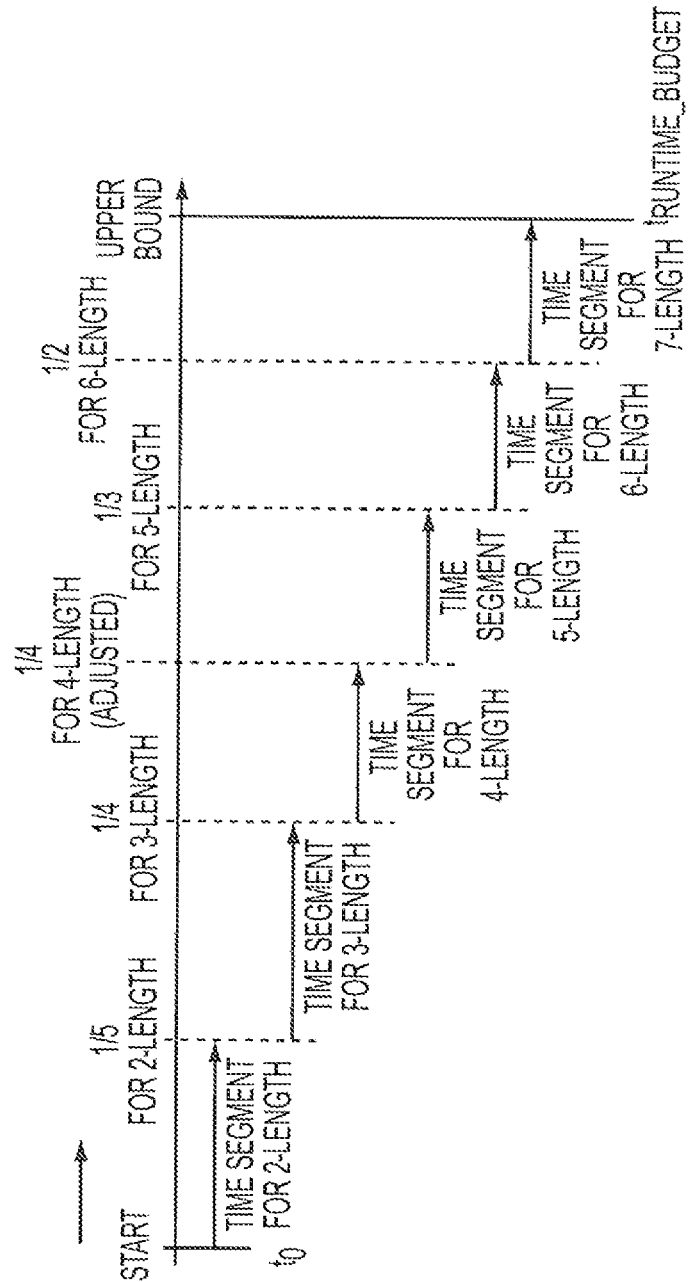
FIG. 3 illustrates various time budget estimation processes that can be used in systems and methods for self-adaptive episode mining under time threshold using delay estimation and temporal division to estimate allocated runtime for various processing stages, according to various embodiments.

Once the episode mining engine 114 and/or other server, platform, application, portal, and/or service obtains the allowed time upper-bound for the next step, the episode mining engine 114 and/or other server, platform, application, portal, and/or service can check whether the estimated delay generated above for the step or stage consumes more than the upper-bound defined by the time threshold. If this is the case, the episode: mining engine 114 and/or other server, platform, application, portal, and/or service can start to prune the amount of current candidate episodes that exceeds the computed upper-bound to complete the next episode mining stage or step. Those pruned candidates must have lower frequency than other candidates. To choose pruned candidates, the episode mining engine 114 and/or other server, platform, application, portal, and/or service can sort the current discovered episodes by frequency, and take lower portion of episodes by the ratio of the over-time. Then, the episode mining engine 114 and/or other server, platform, application, portal, and/or service can prune the candidate episodes that are built using the lower portion of episodes. This process will be repeated over the iteration while adjusting the maximum length, and dividing the remaining time at each step. FIG. 3 illustrates the temporal divisions over the mining process.

In the example illustrated in FIG. 3, is assumed that the episode mining engine 114 and/or other server, platform, application, portal, and/or service has generated 1-length episodes before the start point. At the start point, the episode mining engine 114 and/or other server, platform, application, portal, and/or service can estimate that the number of remaining steps is 5 (i.e., the number of the total steps is 6), divide the remaining time into 5 segments, and set the upper-bound for 2-length step to "$1/5$." If the estimated delay consumes more than the allocated time segment, the episode mining engine 114 and/or other server, platform, application, portal, and/or service can prune some or all episodes from that stage or step. For the 3-length step, the episode mining engine 114 and/or other server, platform, application, portal, and/or service can also estimate that the number of the total steps is 6, and thereby, the remaining steps are 4, since 2 steps have been done. The episode mining engine 114 and/or other server, platform, application, portal, and/or service can then divides the remaining time into 4, and set the upper-bound for 3-length to "$1/4$ for 3-length". The episode mining engine 114 and/or other server, platform, application, portal, and/or service can continue to iteratively generate episodes this way until a point is reach at which further candidate episodes cannot be generated. It may be noted that after generating 3-length episodes, the episode mining engine, 114 and/or other server, platform, application, portal, and/or service sets the number of remaining steps to 4 again (i.e., the number of the total steps is adjusted to 7), instead of 3. This adjustment can be applied over the iteration, since at each step, the set of event sequences to be scanned changes (i.e., some event sequences are removed since they do not contain episodes anymore for the rest of the steps).

Figure 4:
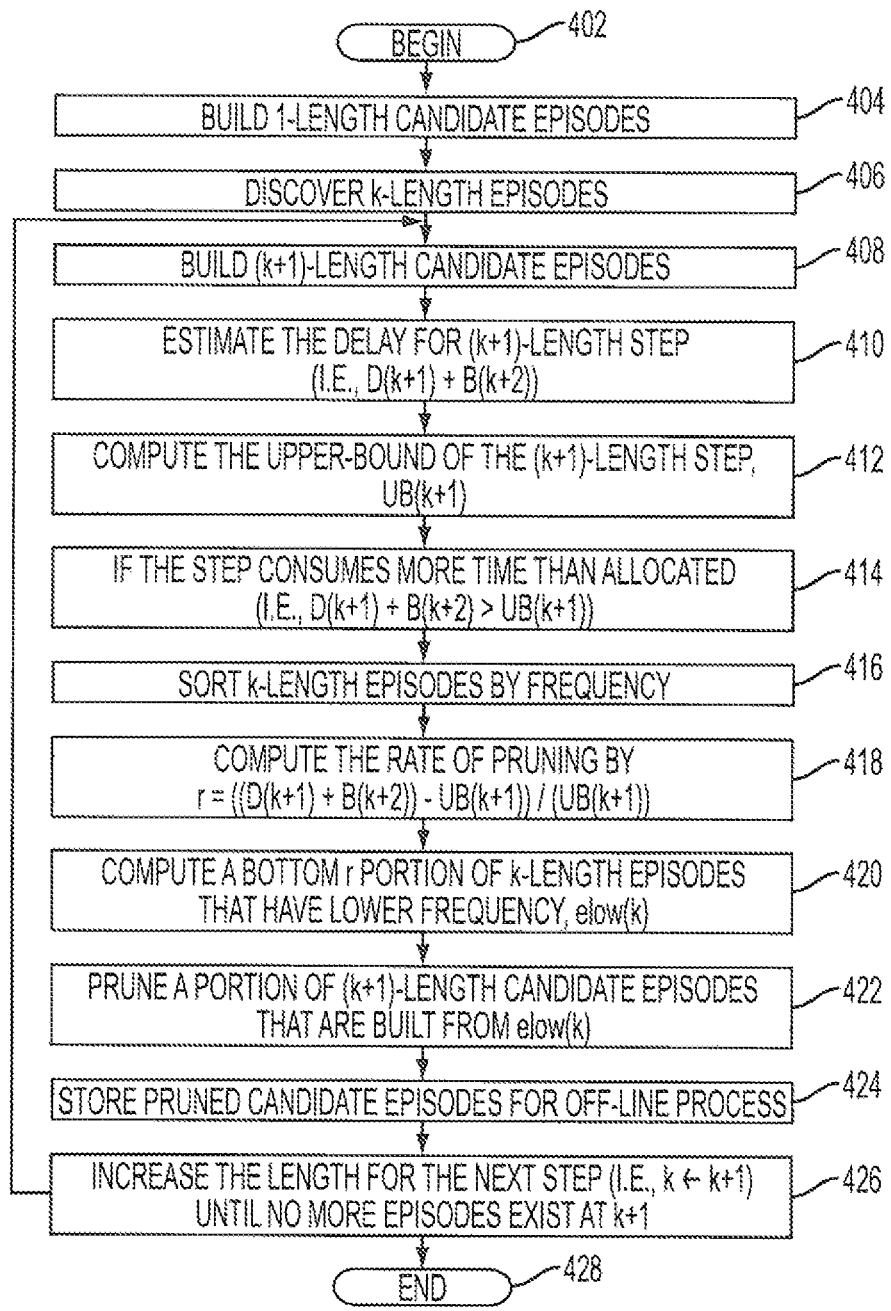
FIG. 4 illustrates a flowchart of aspects of episode mining processing that can be used in self-adaptive episode mining under time threshold using delay estimation and temporal division, according to various embodiments.

FIG. 4 illustrates a flowchart of overall processing that can be used in self-adaptive episode mining under time threshold using delay estimation and temporal division, according to aspects. In 402, processing can begin. In 404, the episode mining engine 114 and/or other server, platform, application, portal, and/or service can initialize the processing of episodes of increasing sequence length by building a set of 1-length candidate episodes. These can comprise a single event matching a single specified event in the set of episode mining parameters 118. In aspects, a large proportion of the set of candidate episodes in log file 112 can be expected to match those parameters. In 406, while any candidate episodes still exist in the overall set of episodes contained in log file 112, the episode mining engine 114 and/or other server, platform, application, portal, and/or service can discover a set of k-length candidate episodes, where initially k=2. The candidate episodes can for example be discovered or identified using platforms and techniques described in the aforementioned co-pending patent application U.S. Ser. No. 13/284,356. The candidate episodes can likewise be discovered or identified using platforms and techniques described in co-pending patent application U.S. Ser. No. 13/413,978, filed Mar. 7, 2012, entitled "Systems. And Methods Of Partitioning Data For Synchronous Parallel Processing" by Gueyoung Jung, et al., assigned or under obligation off assignment to the same entity as this application, and which co-pending patent application is incorporated herein by reference in its entirety.

In 408, the episode mining engine 114 and/or other server, platform, application, portal, and/or service can next build a set of (k+1) length candidate episodes. The additional candidate episodes can for example be likewise be discovered or identified using, platforms and techniques described in the aforementioned co-pending patent applications U.S. Ser. No. 13/284,366, and/or in U.S. Ser. No. 13/413,978. In 410, the episode mining engine 114 and/or other server, platform, application, portal, and/or service can estimate the delay for each (k+1)-length step (i.e., $D(k+1)+B(k+2)$), for instance using techniques described herein.

In 412, the episode mining engine 114 and/or other server, platform, application, portal, and/or service can compute the upper-bound of the (k+1)-length step, $UB(k+1)$, for instance using techniques described herein. In 414, the episode mining engine 114 and/or other server, platform, application, portal, and/or service can determine if the step consumes more time than the allocated remaining time in the time deadline and/or runtime budget, time limit, and/or other time constraint. That is, the episode mining engine 114 and/or other server, platform, application, portal, and/or service can determine whether $D(k+1)+B(k+2)>UB(k+1))$. In 416, assuming the determination is yes, the episode mining engine 114 and/or other server, platform, application, portal, and/or service can sort the k-length episodes by frequency. In 418, the episode mining engine 114 and/or other server, platform, application, portal, and/or service can compute the rate of pruning by determining $r=((D(k+1)+B(k+2))-UB(k+1))/(UB(k+1)$, which corresponds to the timestamp of the end of the last step.

In 420, the episode mining engine 114 and/or other server, platform, application, portal, and/or service can compute a bottom r portion of k-length episodes that have lower frequency, $e_{low}(k)$. In 422, the episode mining engine 114 and/or other server, platform, application, portal, and/or service can prune a portion of the (k+1)-length candidate episodes that are built from $e_{low}(k)$ to generate the set of pruned candidate episodes 124. In 424, the episode mining engine 114 and/or other server, platform, application, portal, and/or service can store the set of pruned candidate episodes 124 for off-line processing, and/or for other purposes. For example, the episode mining engine 114 and/or other server, platform, application, portal, and/or service can store the set of pruned candidate episodes to the episode mining data store 116, and/or to other databases, data stores, and/or destinations. In 426, the episode mining engine 114 and/or other server, platform, application, portal, and/or service can increase the length for the next step (i.e., k←k+1). In aspects, after 426, processing can then return to 406 while episodes still exist. In 428, when no more episodes exist, processing can return to a prior processing point, jump to a further processing point, repeat, or end.

According to aspects, the inventors herein have generated test or evaluation results for episode mining platforms and techniques described herein, using sample event sequences. The evaluation utilized empirical logs that contain real-world Website visit histories and call sessions of more than 40,000 users and more than 800,000 event sequences. First, the accuracy of delay estimation method described herein is analyzed. Since the amount of pruning is determined based on this estimation, the estimation should be reasonably accurate. For this evaluation, a set of event sequences that are used for a single user were extracted, and episode mining processing according to platforms and techniques of the present teachings were executed with the delay estimation component.

Figure 5:
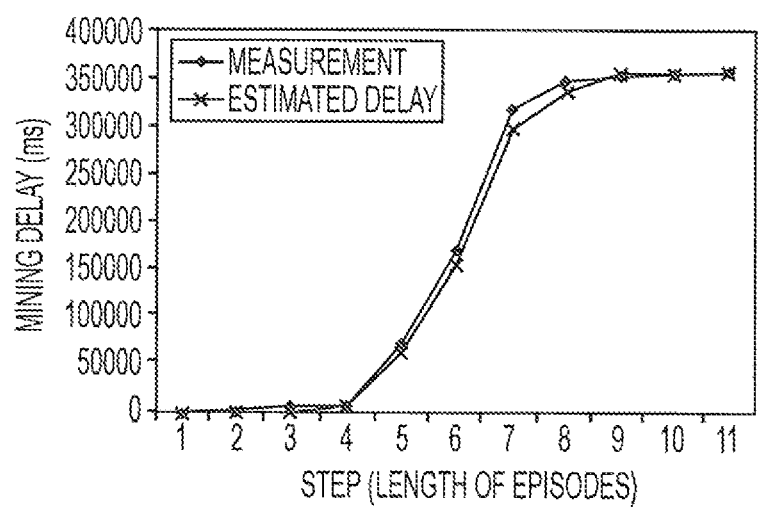
FIG. 5 illustrates a graphical chart of the accuracy of the delay estimation, according to aspects of the present teachings.

FIG. 5 illustrates an analysis of the accuracy of the delay estimation component. The estimated delay was compared to the measured delay along the mining process, from step 1 up to step 11. The results as shown indicate that the overall error rate is reasonable (around 8%). The error rate can fluctuate and be, relatively high at a certain step (e.g., step 7 in FIG. 3), but according to aspects the platforms and techniques of the present teachings can quickly reduce the error in the rest of steps using the moving average technique. Tests using other sets of event sequences have produced consistent estimate error rates.

The inventors herein have further evaluated the accuracy and the completeness of self-adaptive episode mining under time threshold using delay estimation and, temporal division, in terms of episode identification. In these analyses, a naïve episode mining process that does not use techniques according to the present teachings was run, and generated all episodes that have frequency more than 10%. These results were used as a baseline to normalize other results (i.e., this result represents a completeness of 100%).

Figure 6:
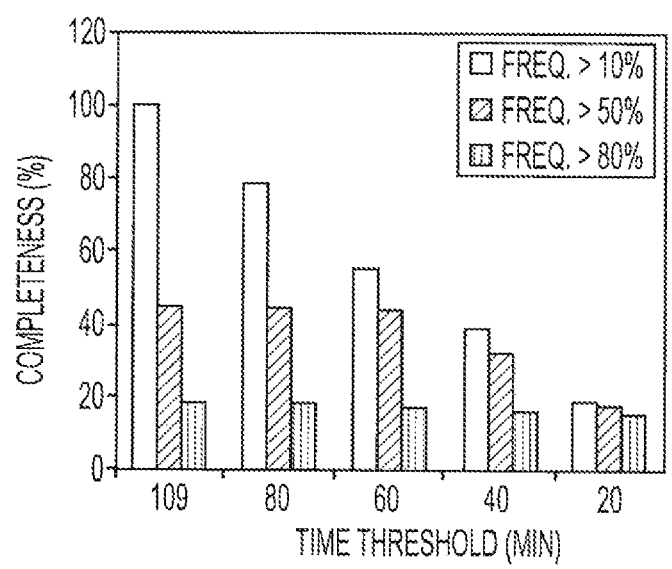
FIG. 6 illustrates a graphical chart of the completeness of the results of episode mining, according to aspects of the present teachings.

As shown in FIG. 6, the completeness of generating all episodes (i.e., frequency more than 10%) linearly decreases as the runtime budget or time threshold is decreased. This is in part because the platforms and techniques according to the present teachings prune those low episodes from the search space, as described herein. However, for higher frequency, the platforms and techniques according to the present teachings generate as many as possible. As shown, in the analyses platforms and techniques according to the present teachings can generate all episodes which have more than 50% frequency, when the time threshold is set, to 60 minutes. It can still generate almost all episodes which have more than 80% frequency, even in the case where the time threshold is reduced to 20 minutes. This shows that platforms and techniques according to the present teachings can generate almost all highly frequent episodes within a given time threshold, rather than blindly being stopped with a set of inaccurate episodes as would be the case with known episode mining approaches.

Figure 7:
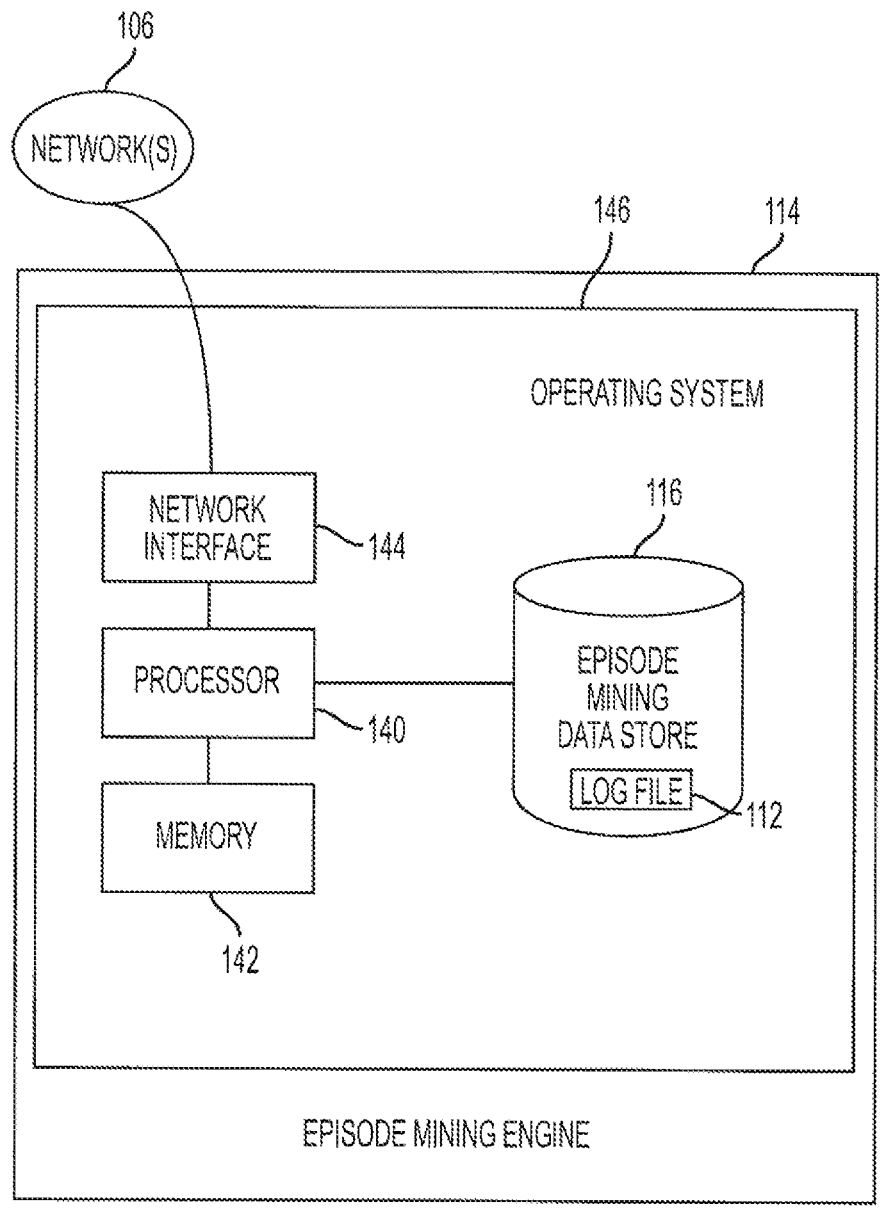
FIG. 7 illustrates exemplary hardware, software, and other resources that can be used in self-adaptive episode mining under time threshold using delay estimation and temporal division, according to various embodiments.

FIG. 7 illustrates various hardware, software, and other resources that can be used in implementations of self-adaptive episode mining under time threshold using delay estimation and temporal division, according to embodiments. In embodiments as shown, the episode mining engine 114 and/or other server, platform, application, portal, and/or service can comprise a platform including processor 140 communicating with memory 142, such as electronic random access memory, operating under control of or in conjunction with an operating system 146. The processor 140 in embodiments can be incorporated in one or more servers, clusters, and/or Other computers or hardware resources, and/or can be implemented using cloud-based resources. The operating system 146 can be, for example, a distribution of the Linux™ operating system, the Unix™ operating system, or other open-source or proprietary operating system or platform. The processor 140 can communicate, with the episode mining data store 116, such as a database stored on a local hard drive or drive array, to access or store the log file 112, and/or subsets of selections thereof, along with other content, media, or other data. The processor 140 can, further communicate with a network interface 144, such as an Ethernet or wireless data connection, which in turn communicates with the one or more networks 106, such as the Internet or other public or private networks, via which episode mining engine 114 and/or other server, platform, application, portal, and/or service can communicate with the usage capture engine 108, and/or other device, application, or service. The processor 140 can, in general, be programmed or configured to execute control logic and control language processing operations, including to generate the set of selected episodes 122 and other data or output. In aspects, the usage capture engine 108, and any of the set of clients 102, can be or include resources similar to those of the episode mining engine 114 and/or other server, platform, application, portal, and/or service, and/or can include additional or different hardware, software, and/or other resources. Other configurations of the episode mining engine 114, usage capture engine 108, set of clients 102, associated network, connections, and other hardware, software, and service resources are possible.

The foregoing description is illustrative, and variations in configuration and implementation may occur to persons skilled in the art. For example, while embodiments have been described in which the episode mining engine 114 comprises, and/or is hosted in, one platform or service, in embodiments, the episode mining engine 114 can be incorporated multiple servers, platforms, and/or services. Similarly, while embodiments have been described in which episode log files are captured from one set of network resources 104, in embodiments, the usage and other data of log file 112 can be from multiple or disparate networks. Other resources described as singular or integrated can in embodiments be plural be distributed, and resources described as multiple or distributed can in embodiments be combined. The scope of the present teachings is accordingly intended to be limited only by the following claims.

What is claimed is:

1. A method of mining data, comprising:
accessing a log file comprising a set of candidate episodes each comprising a sequence of events;
receiving a runtime budget from a user for detection of a set of detected episodes from the set of candidate episodes using a set of pattern criteria;
generating, based on the runtime budget and the set of pattern criteria, the set of detected episodes from the set of candidate episodes;
generating a set of episode stages each comprising a different sequence depth for the sequence of events; and
estimating a time duration for execution of each episode stage;
wherein generating the set of detected episodes comprises scanning each stage of the set of episode stages to detect an episode matching the set of pattern criteria,
wherein generating the set of episode stages comprises generating an estimated maximum sequence depth corresponding to a last episode stage, and
wherein generating the estimated maximum sequence depth comprises estimating the maximum sequence depth to be equal to a length of the longest unique sequence of events in the set of candidate episodes.

2. The method of claim 1, wherein estimating the time duration for execution of each episode stage comprises a remaining amount of the runtime budget divided by the number of episode stages.

3. The method of claim 2, further comprising correcting the estimated time duration for execution of each episode stage after completion of execution of the corresponding episode stage.

4. The method of claim 1, wherein generating the set of episode stages comprises storing the set of pruned candidate episodes for batch processing.

5. The method of claim 1, further comprising receiving a minimum completeness threshold indicating a minimum frequency of a set of detected episodes for which detecting the set of detected episodes from the set of candidate episodes will detect all possible matching episodes in the set of candidate episodes.

6. The method of claim 1, wherein the events in each sequence of events comprises at least one of navigating to a Web site, logging into a Web site, transmitting an email message, contacting a call center, or initiating an instant messaging session.

7. The method of claim 6, wherein the set of pattern criteria comprises at least one pattern sequence for each at least one sequence depth.

8. A system, comprising:
an interface to a data store storing a log file comprising a set of candidate episodes each comprising a sequence of events; and
a processor, communicating with the data store via the network interface, the processor being configured to —
access the set of candidate episodes from the log file,
receive a runtime budget from a user for detection of a set of detected episodes from the set of candidate episodes using a set of pattern criteria,
generate, based on the runtime budget and the set of pattern criteria, the set of detected episodes from the set of candidate episodes;
generate a set of episode stages each comprising a different sequence depth for the sequence of events; and
estimate a time duration for execution of each episode stage;
wherein generating the set of detected episodes comprises scanning each stage of the set of episode stages to detect an episode matching the set of pattern criteria;
wherein generating the set of episode stages comprises generating an estimated maximum sequence depth corresponding to a last episode stage; and
wherein generating the estimated maximum sequence depth comprises estimating the maximum sequence depth to be equal to a length of the longest unique sequence of events in the set of candidate episodes.

9. The system of claim 8, wherein estimating the time duration for execution of each episode stage comprises a remaining amount of the runtime budget divided by the number of episode stages.

10. The system of claim 9, wherein the processor is further configured to correct the estimated time duration for execution of each episode stage after completion of execution of the corresponding episode stage.

11. The system of claim 8, wherein generating the set of episode stages comprises storing the set of pruned candidate episodes for batch processing.

12. The system of claim 8, wherein the processor is further configured to receive a minimum completeness threshold indicating a minimum frequency of a set of detected episodes for which detecting the set of detected episodes from the set of candidate episodes will detect all possible matching episodes in the set of candidate episodes.

13. The system of claim 8, wherein the events in each sequence of events comprises at least one of navigating to a Web site, logging into a Web site, transmitting an email message, contacting a call center, or initiating an instant messaging session.

14. The system of claim 13, wherein the set of pattern criteria comprises at least one pattern sequence for each at least one sequence depth.

* * * * *